United States Patent
Li et al.

(10) Patent No.: US 11,095,540 B2
(45) Date of Patent: Aug. 17, 2021

(54) HYBRID ANOMALY DETECTION FOR RESPONSE-TIME-BASED EVENTS IN A MANAGED NETWORK

(71) Applicant: ServiceNow, Inc., Santa Clara, CA (US)

(72) Inventors: Qingbin Li, Kirkland, WA (US); Brian Robert Silverstein, Seattle, WA (US); James Allen Crotinger, Kirkland, WA (US); Dariush Shahgoshtasbi, Bellevue, WA (US); Darren Hou, Bellevue, WA (US); Yujie Fang, Redmond, WA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

(21) Appl. No.: 16/255,684

(22) Filed: Jan. 23, 2019

(65) Prior Publication Data
US 2020/0236015 A1    Jul. 23, 2020

(51) Int. Cl.
*H04L 12/26*     (2006.01)
*G06N 20/00*     (2019.01)
*G06F 30/20*     (2020.01)
*G06F 111/10*    (2020.01)

(52) U.S. Cl.
CPC .............. *H04L 43/08* (2013.01); *G06F 30/20* (2020.01); *G06N 20/00* (2019.01); *G06F 2111/10* (2020.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |

(Continued)

OTHER PUBLICATIONS

Markus Goldstein, "Histogram-based Outlier Score (HBOS): A fast Unsupervised Anomaly Detection Algorithm", German Research Center for Artificial Intelligence (DFKI), 2012, pp. 59-63.

*Primary Examiner* — Kevin T Bates
*Assistant Examiner* — Emad Siddiqi
(74) *Attorney, Agent, or Firm* — Fletcher Yoder PC

(57) ABSTRACT

A computing device is provided that is configured to obtain, from a managed network, a plurality of response times of a network-based service provided by the managed network; to train, based on the plurality of response times, a probability distribution to model the managed network; to receive an additional response time from the managed network; to use the probability distribution to determine, for the additional response time, a percentile based on the additional response time; based on the percentile, to determine that the additional response time is anomalously high with respect to the plurality of response times of the network-based service; and to transmit, to a client device associated with the managed network, an indication that the additional response time is anomalously high. The probability distribution includes a central portion based on a plurality of bins and a tail portion based on a parametric distribution.

20 Claims, 10 Drawing Sheets

(56) References Cited

U.S. PATENT DOCUMENTS

| | | |
|---|---|---|
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,925,981 B2 | 4/2011 | Pourheidari |
| 7,933,927 B2 | 4/2011 | Dee |
| 7,945,860 B2 | 5/2011 | Vambenepe |
| 8,082,222 B2 | 12/2011 | Rangarajan |
| 8,151,261 B2 | 4/2012 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,659,051 B2 | 4/2017 | Hutchins |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 2014/0068769 A1* | 3/2014 | Neil ............... G06N 7/005 726/23 |
| 2015/0379110 A1* | 12/2015 | Marvasti ......... G06F 11/0754 707/740 |
| 2018/0225320 A1* | 8/2018 | Saini ............... G06F 16/215 |
| 2018/0365298 A1* | 12/2018 | Poghosyan ......... G06F 17/18 |
| 2019/0377774 A1* | 12/2019 | Joshi ............... G06N 7/005 |

* cited by examiner

HYBRID ANOMALY DETECTION FOR RESPONSE-TIME-BASED EVENTS IN A MANAGED NETWORK

BACKGROUND

Managed network environments are configured to provide a variety of services to individuals or systems both inside the environment (e.g., networked file sharing) and outside the environment (e.g., serving web pages to remote computers via the internet). A variety of internal and external events can cause the provision of these services to degrade. For example, a sudden increase in requests for a service, damage to a server or other hardware system, loss of power, a cyber-attack, or other events can result in failure to provide the services, delayed provision of the services, or some other unwanted behaviors. Monitoring systems can be provided to detect the occurrence of such events and to automatically address them (e.g., by re-balancing the load across additional hardware) and/or to signal to a human operator that an event has occurred that may require intervention.

SUMMARY

The embodiments herein provide methods for anomaly detection based on a time series of samples of a signal. For example, the samples could represent response times of a web server, mail server, or other network-based service provided by a managed network. An increase or other anomaly in the signal could indicate that an event has occurred that requires automated mitigation and/or human intervention, e.g., a failure of a server or an intrusion attempt. Thus, accurate detection of such anomalies can reduce service interruption or diminution by providing appropriate alerts while reducing costs and/or the required amount of human intervention by reducing false-positives.

In order to detect whether a particular sample or set of samples of such a signal represent an anomaly, it can be advantageous to determine how likely the value of each of the samples is relative to an expected distribution of the samples. Such a distribution can be readily determined from a set of 'normal' samples if the 'normal' samples comport with a Gaussian distribution or other commonly-used distribution. In such examples, the determined distribution can then be used to determine a percentile score, a Z-score, or some other measure of how 'normal' a particular observed sample is. This level of 'normalcy' can then be used, alone or in combination with percentiles or other levels determined for additional samples, to determine whether an anomaly has occurred (e.g., by determining that the particular sample(s) are especially unlikely to have occurred in the absence of an anomaly).

In examples where the samples do not comport with a known analytical distribution, or where the proper analytical distribution is not known ahead of time and/or cannot be determined, a non-parametric distribution can be used instead. For example, a histogram can be determined (using uniform or non-uniform bin widths) for the signal based on a set of samples of the signal. However, it can be difficult to estimate the edges of such a distribution, as the range of values represented in a finite set of samples is limited. This is especially the case where the 'true' distribution is especially heavy-tailed. In such examples, a histogram-only distribution is likely to under-estimate the likelihood of values outside the range represented by the original set of samples, leading to increased false-positives in anomaly detection.

Such a histogram-based method (or other non-parametric method for distribution estimation) can be improved by using a heavy-tailed distribution (e.g., a log-logistic distribution or a log-normal distribution) to estimate the tail portions of the distribution of the set of samples. That is, regions beyond the range of values represented by the original set of samples could be estimated by the tail portion of a heavy-tailed distribution that has been fitted to some or all of the set of samples. Regions within the range of values represented by the original set of samples could be estimated by the histogram (or other non-parametric distribution) estimated from the set of samples. A transition region (e.g., a range of values representing the last find bins of the histogram) may be represented by a combination of the two distributions (e.g., a weighted combination of the two, smoothly transitioning from the histogram to the heavy-tailed distribution). Alternatively, a short-tailed parametric distribution or some other parametric distribution could be fitted to the tails of the observed data, as appropriate.

Accordingly, a first example embodiment may involve a computing device disposed within a computational instance of a remote network management platform. The computing device is configured to: (i) obtain, from a managed network, a plurality of response times of a network-based service provided by the managed network, wherein the response times span a range of values, and wherein the computational instance is dedicated to the managed network; (ii) train, based on the plurality of response times, a probability distribution to model the managed network; (iii) receive an additional response time from the managed network; (iv) use the probability distribution to determine, for the additional response time, a percentile based on the additional response time; (v) based on the percentile, determine that the additional response time is anomalously high with respect to the plurality of response times of the network-based service; and (vi) transmit, to a client device associated with the managed network, an indication that the additional response time is anomalously high. Training the probability distribution includes: (a) generating, based on the plurality of response times, a plurality of bins that span respective portions of the range of values, wherein generating a particular bin of the plurality of bins includes determining a number of the plurality of response times whose values fall within the particular bin; and (b) generating the probability distribution for the plurality of response times. The generated probability distribution includes a central portion and a tail portion. Generating the probability distribution includes generating the central portion based on at least one of the plurality of bins and generating the tail portion by fitting a parametric distribution to at least one of the plurality of response times.

A second example embodiment is provided that includes: (i) obtaining, from a managed network, a plurality of response times of a network-based service provided by the managed network, wherein the response times span a range of values; (ii) training, based on the plurality of response times, a probability distribution to model the managed network; (iii) receiving an additional response time from the managed network; (iv) using the probability distribution to determine, for the additional response time, a percentile based on the additional response time; (v) based on the percentile, determining that the additional response time is anomalously high with respect to the plurality of response times of the network-based service; and (vi) transmitting, to a client device associated with the managed network, an indication that the additional response time is anomalously high. Training the probability distribution includes: (a) generating, based on the plurality of response times, a plurality of bins that span respective portions of the range of values, wherein generating a particular bin of the plurality of bins comprises determining a number of the plurality of response times whose values fall within the particular bin; and (b) generating the probability distribution for the plurality of response times. The generated probability distribution includes a central portion and a tail portion. Generating the probability distribution includes generating the central portion based on at least one of the plurality of bins and generating the tail portion by fitting a parametric distribution to at least one of the plurality of response times.

In a third example embodiment, an article of manufacture may include a non-transitory computer-readable medium, having stored thereon program instructions that, upon execution by a computing system, cause the computing system to perform operations in accordance with the second example embodiment.

In a fourth example embodiment, a computing system may include at least one processor, as well as memory and program instructions. The program instructions may be stored in the memory, and upon execution by the at least one processor, cause the computing system to perform operations in accordance with the second example embodiment.

In a fifth example embodiment, a system may include various means for carrying out each of the operations of the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
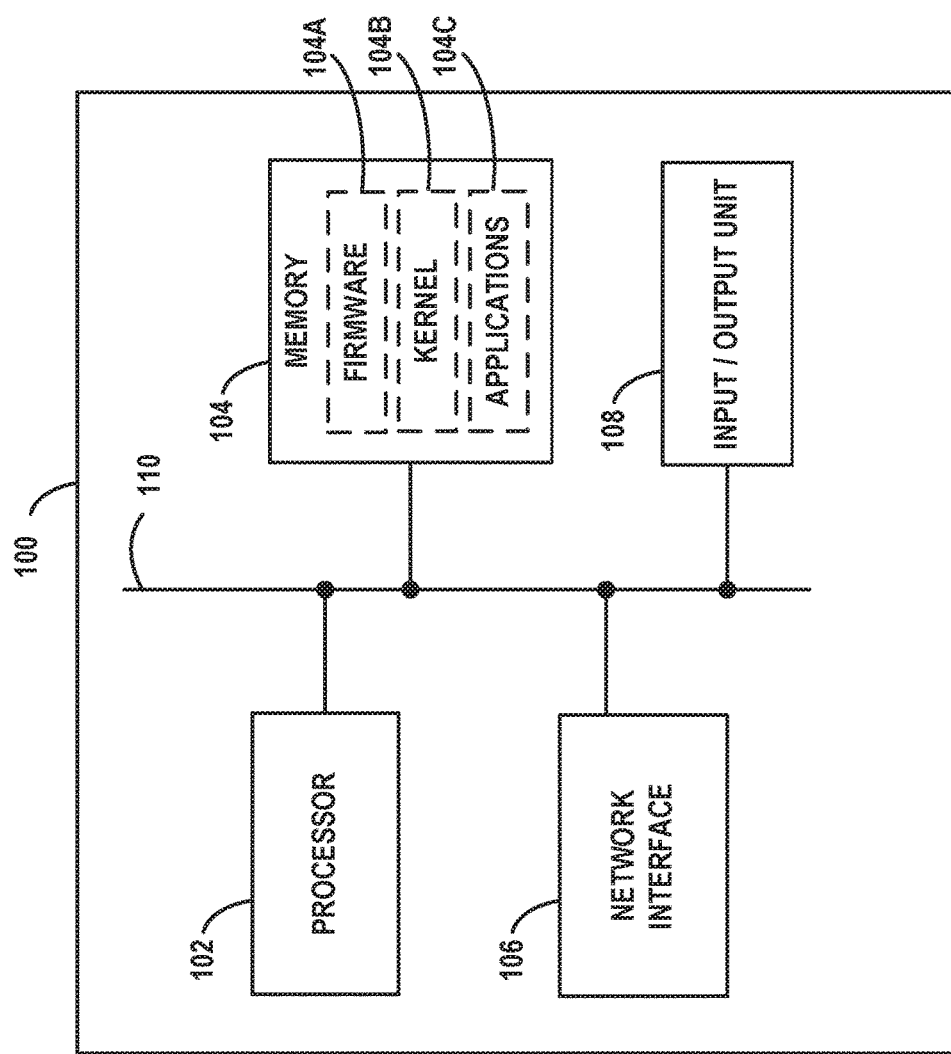
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid-state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wi-Fi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wi-Fi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
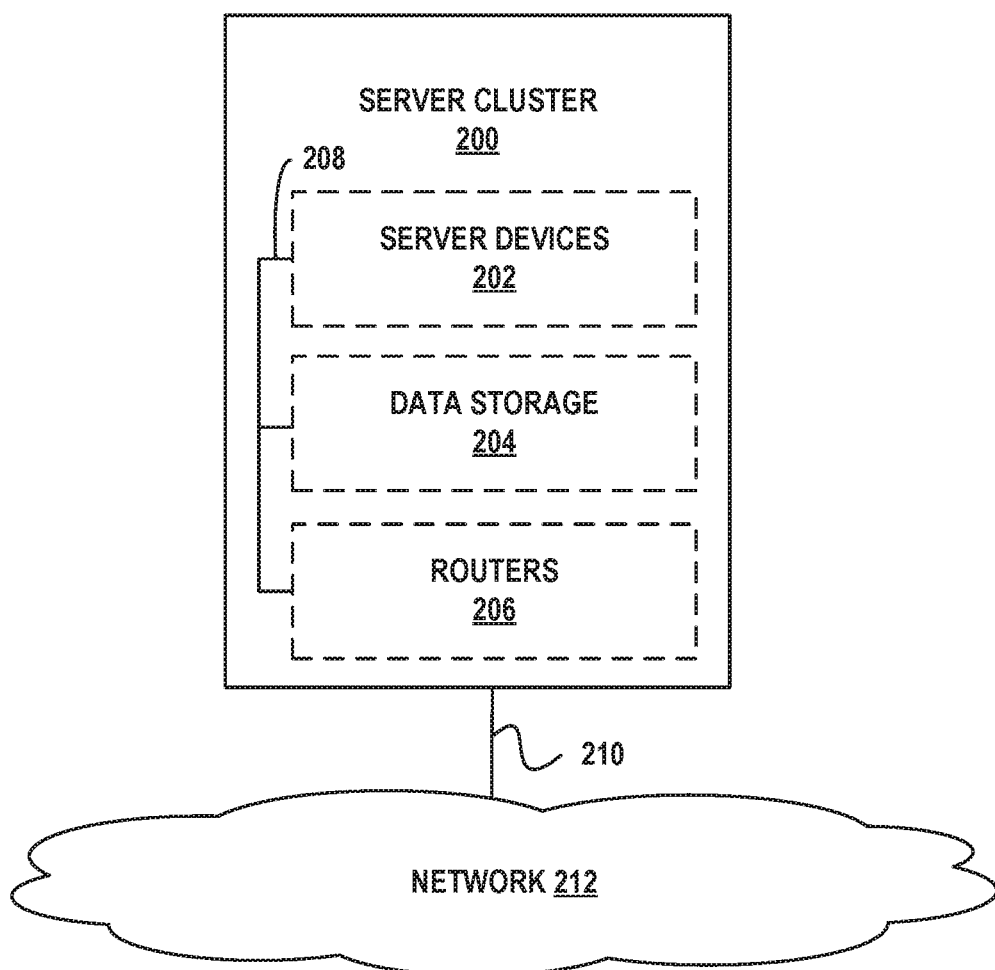
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid-state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
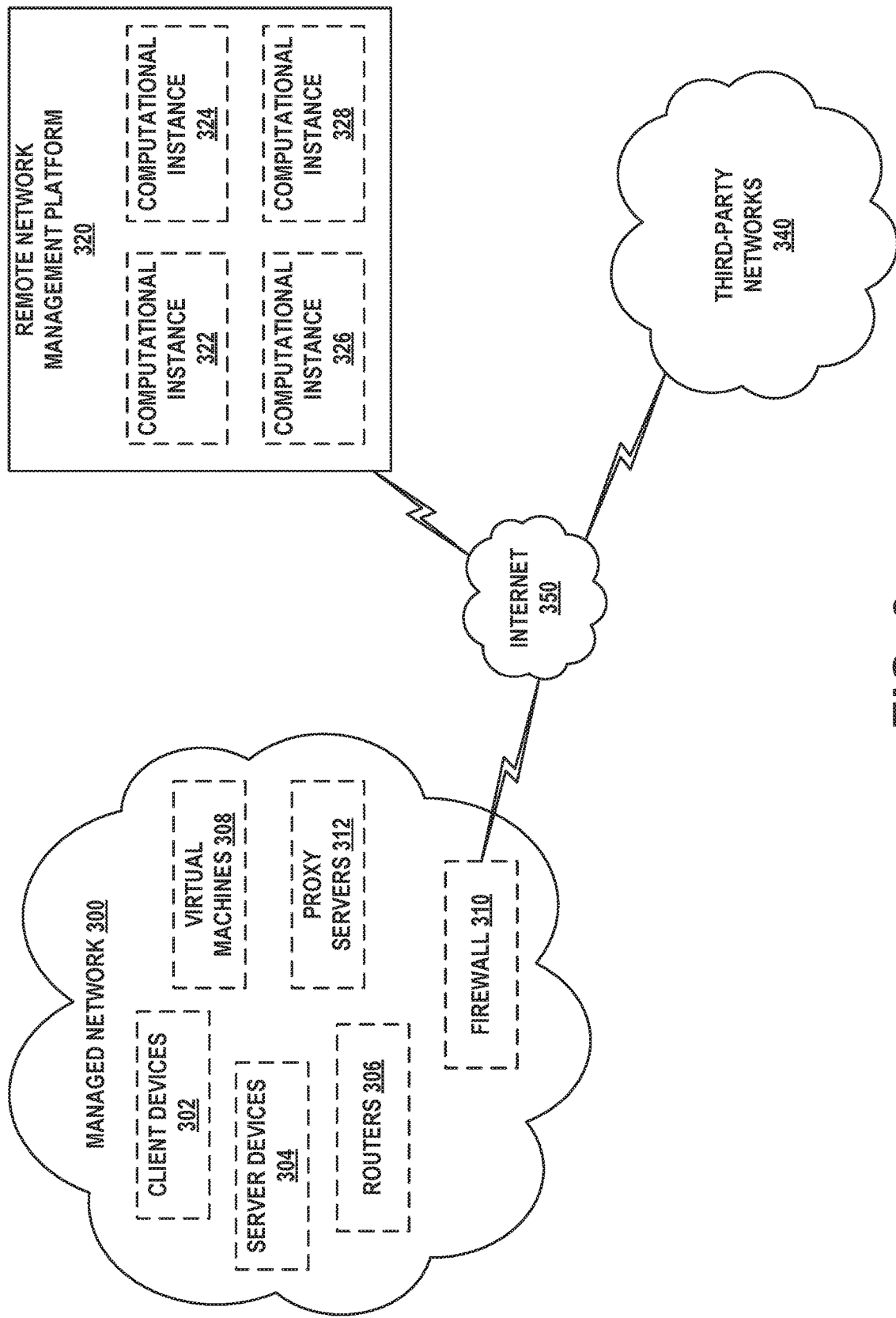
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are commingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents commingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
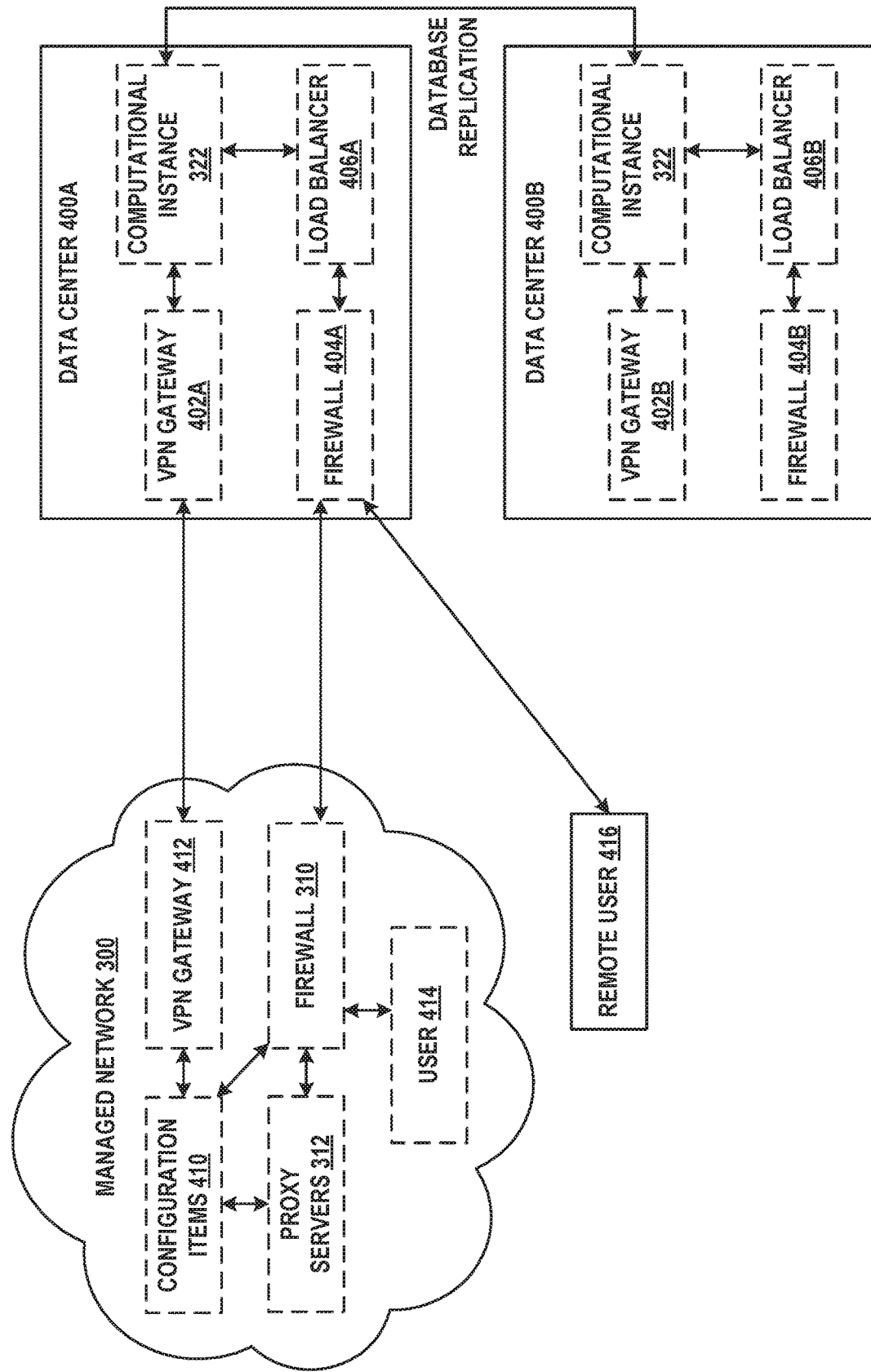
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
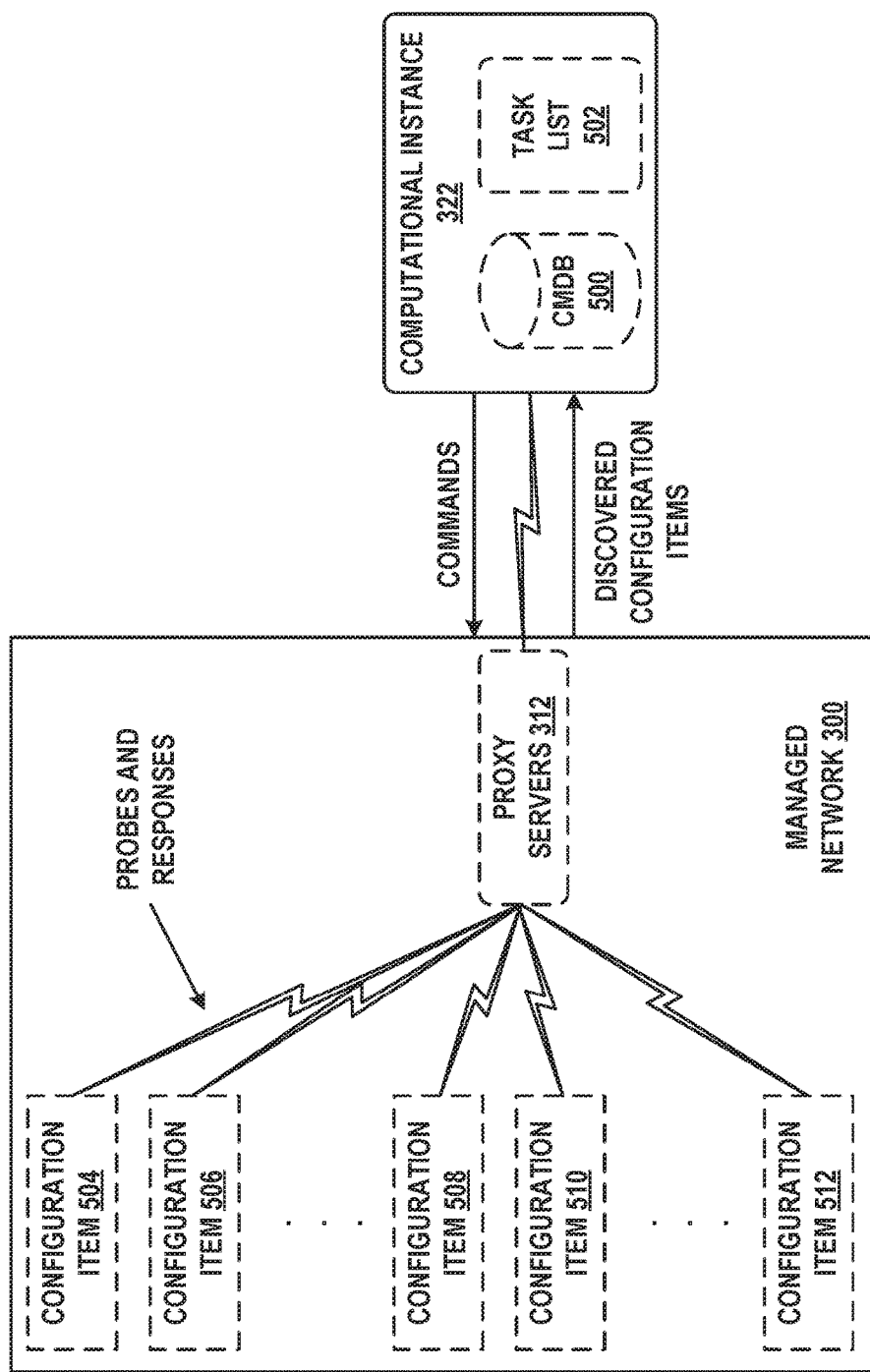
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
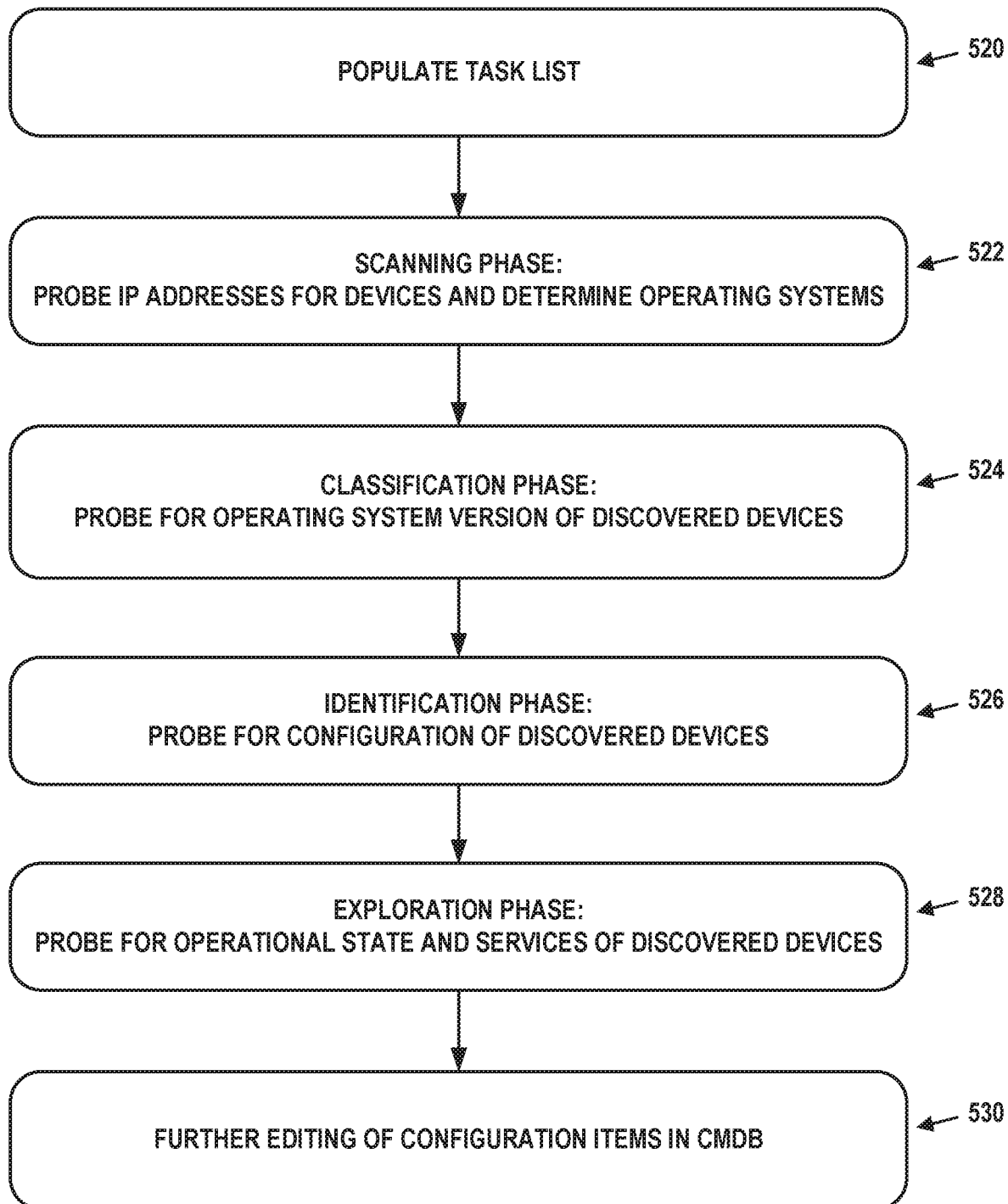
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Anomaly Detection

A managed network or other information technology system(s) can, due to a variety of factors, begin to exhibit reduced performance. This can include increased latency or response time when responding to requests from other systems (e.g., requests to serve web pages), increased power usage, failure to perform tasks (e.g., failure to respond to requests from other systems), data loss, out-of-memory conditions, or other unwanted behaviors. Such reduced performance may be due to intrusion attempts, system mis-configuration, hardware failure, software failure, loss of power, an increase in usage of a provided service (e.g., a sudden increase in requests for a web service), or some other anomalous events. It can be beneficial to quickly detect such events and to take automatic action to rectify them (e.g., by degrading a provided service in a controlled manner) and/or to alert a person to take corrective action. However, false positives can increase costs (e.g., by increasing the amount of human intervention) or cause other unwanted effects, so it is also important to accurately detect such events.

To detect such unwanted events, anomalies can be detected in a signal generated by the managed network or other information technology system. Such a signal could include a series of samples, over time, of a response time, a latency, an accuracy, a rate of data loss (e.g., packet loss), or some other metric describing the ability of the managed network to provide a network-based service. Alternatively, these methods may be used to model sets of data that are not ordered and/or that do not represent a time series (e.g., a set of failure times of a service or other system). Such a network-based service could include an email service, a search service, a webpage service, a chat service, an audio/visual streaming service, an audio/visual communications service, a domain name lookup service, a social media service, and internet-of-things service, or some other service. Additionally or alternatively, such a signal could include a series of samples, over time, of a proportion of memory used, power usage, a number of compute cores used, a number of VMs used, a rate of out-of-memory errors, a datacenter temperature, or some other metric describing the functioning of the software and/or hardware of the managed network providing. Alternatively, the methods described herein may be used to model sets of data that are not ordered and/or that do not represent a time series.

Figure 6A:
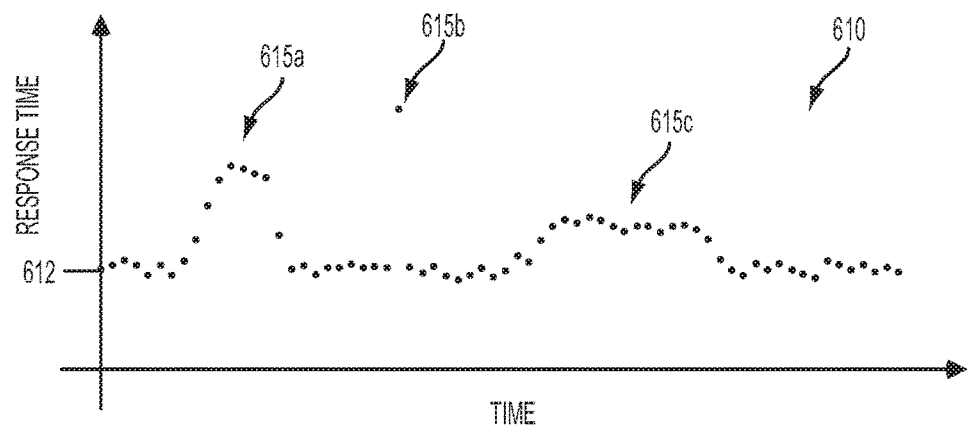
FIG. 6A is a time sequence of response times, in accordance with example embodiments.

FIG. 6A depicts an example set of samples of such a signal 610. The samples represent response times of a network-based service provided by a managed network. The response time could be, e.g., average response times during respective regularly-spaced periods of time. The response times 610 generally have values clustered near an average response time 612. However, occasionally anomalies will occur (e.g., temporary increases in requests in the web-based service, hardware failures) that cause the response time of the service to deviate significantly from this level. FIG. 6A depicts three such anomalies 615a, 615b, and 615c.

Such anomalies can be detected, based on the response times, in a variety of ways. In some examples, the deviation of individual samples, if greater than a specified threshold level, could be detected as an anomaly (e.g., second anomaly 615b). Additionally or alternatively, anomaly detection could be based on multiple samples. For examples, anomalies 615a and 615c could be detected based on the deviation of multiple response times from the average level 612. Such anomaly detection could incorporate a trade-off between the magnitude of the deviation and the number of samples required to detect an anomaly. For example, the first anomaly 615a could be detected because, while it persists over fewer response times than the third anomaly 615c, for those samples it deviates from the average 612 by a greater amount. Anomaly detection could include template matching or some other methods or techniques.

In response to such anomaly detection, an indication could be transmitted (e.g., to a cellphone, computer, or other system operated by a human) of the anomaly. Additionally or alternatively, the detected anomaly could be stored, along with related system performance data, to permit diagnostics and troubleshooting to occur later. In yet another example, anomaly detection could prompt automated attempts to rectify whatever scenario may be causing the anomaly, e.g., by bringing additional server(s) online, by spinning up additional VMs, by degrading a provided service in a controlled manner, or by taking some other automatic action.

The anomaly detection may be performed by a system (e.g., a server, a VM) of the managed network. Alternatively, an external supervisory system outside of the managed network could obtain, from the managed network, response times or other samples of a performance metric for the network-based service provided by the managed network. The external supervisory system could then transmit, to a client device associated with the managed network, an indication that an anomaly has been detected. For example, a remote network management platform as described elsewhere herein could receive, from a managed network, a plurality of response times of the network-based service. The remote network management platform could then determine that the received response times are anomalously high and transmit an indication thereof to a system of the managed network (e.g., a server, a terminal used for monitoring the operational status of the managed network) and/or to some other client device associated with the managed network (e.g., a cellphone associated with an administrator account of the managed network).

In order to detect the presence of an anomaly (e.g., anomalously high values) in a set of response times or some other performance metric, it can be beneficial to have, for each of the response times, a measure of the degree of how much the response time deviates from expected levels. For example, a percentile score indicating the percent of overall response times that a particular response time is greater than, or a Z-score indicating the deviation of the particular response time from a mean response time, normalized by an amount related to the level of variability observed in the overall set of response times. This percentile score or other measure of the response time can then be used to determine whether the response time, by itself or as one of a set of response times, is anomalously high, anomalously low, or otherwise anomalous relative to the usually observed performance of the network-based service for which the response times were generated.

Translating the response times into percentile scores allows the anomaly detection algorithm to be independent of the particular service and/or performance metric for which anomalies are to be detected. For example, such an anomaly detector could be developed and used to detect anomalies in a variety of different response times for a variety of different network-based services by training the detector to operate based on percentiles. Such a detector could then be used to detect anomalies in a novel performance metric (e.g., response times for a newly-developed network-based service) by translating the values of the novel performance metric into percentile. This is at least partially because the percentile scores can represent the degree of deviation of each of the samples of the novel performance metric from an expected value of the novel performance metric.

Thus, such an anomaly detector can be used to detect anomalies in a set of response times or some other performance metric by developing an estimate of the distribution of the performance metric. Further, the performance of such an anomaly detector can be improved by improving the estimated distribution, e.g., based on additional observations of the performance metric. Yet further, in examples where the underlying behavior of the performance metric changes over time, the performance of the anomaly detector can be maintained at a high level by periodically updating the estimated distribution (e.g., based on recently-observed samples of the performance metric).

In some examples, determining a distribution for the response times includes fitting a parametric distribution to the response times. Such a parametric distribution could include a Gaussian distribution, a log-normal distribution, an exponential distribution, a chi-squared distribution, a half-normal distribution, a half-logistic distribution, or some other parametric distribution. The parametric distribution used can be manually selected based on heuristic information about the response times or other performance metric. Additionally or alternatively, the distribution used can be selected from a set of potential distributions, e.g., by selecting the distribution with the highest likelihood relative to the data. The distribution can be a heavy-tailed distribution (i.e., a distribution having one or two tails that are heavier than the exponential distribution) to represent the observation that the response times exhibit, from time to time, anomalous outlier behavior.

Figure 6B:
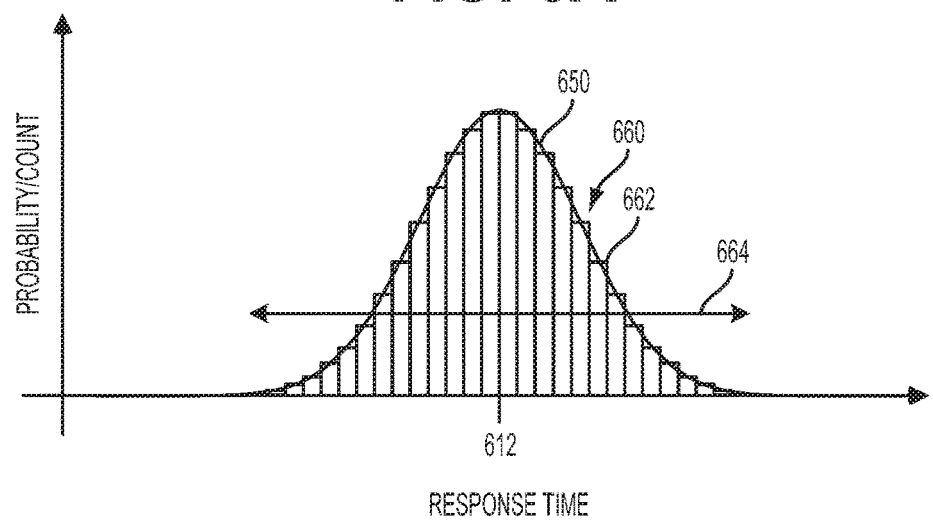
FIG. 6B shows a continuous probability distribution function and a discrete probability mass function for a set of response times, in accordance with example embodiments.

FIG. 6B shows an example Gaussian distribution 650 (a type of parametric distribution) fitted to a set of response times (e.g., a set of response times that includes the response times 610 illustrated in FIG. 6A as well as a plurality of additional response times that are more tightly clustered around the average 612). However, where the underlying distribution of the response times is unknown (e.g., a mixture of an unknown number of unknown parametric distributions), it can be difficult to fit accurately and completely fit the observed data to one (or more) selected parametric distributions. In such examples, it can be advantageous to use a non-parametric distribution to fit the observed response times. For example, a histogram could be fitted to the response times, and the histogram (or a cumulative distribution function or other function determined from the histogram) then used to determine a percentile or other measure of the variation of a particular response time from the usually observed response times. FIG. 6B shows an example of such a histogram 660 determined from such a set of response times. Alternatively, kernel density estimation could be used to non-parametrically model the response times.

The histogram 660 is composed of a plurality of bins (including an example bin 662) spanning a range of values 664 across which response times were observed. Each bin spans a respective range of values of response time, and the count for a particular bin is determined by determining how many of the observed response times fall within the range of values spanned by the particular bin. The bins may have uniform length (e.g., as do the bins of the histogram 660 in FIG. 6B) or the bins may have non-uniform length. For example, the lengths of the bins could be selected such that the bins contain equal or substantially equal numbers of observed response times (in which case the height of the bins would all be approximately the same, with narrower bins located toward the center of the distribution and wider bins toward the edges). If multiple response times have the same value, such bins could include more than the equal number of response times. In such instances, some of the equal-valued response times could be placed in an adjacent bin. The number of bins could be selected based on the response times. For example, the number of bins could be set to the square root of the number of response times used to generate the histogram.

Figure 6C:
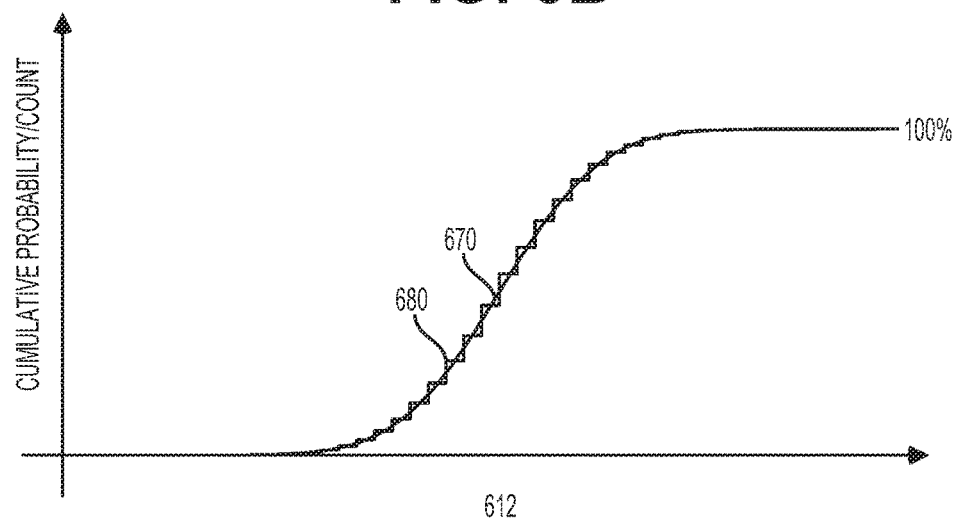
FIG. 6C shows a cumulative distribution function for a set of response times, in accordance with example embodiments.

A histogram (e.g., 660) or other estimate of the probability distribution of the response times (e.g., a fitted Gaussian 650 or other parametric distribution) could then be used to generate percentiles for additional response times. This could include generating a cumulative distribution function from the estimated distribution. For example, FIG. 6C depicts a first cumulative distribution function 670 that could be determined, for the response times, from the Gaussian distribution 650 and a stepwise cumulative distribution function 680 that could be determined from the histogram 660. A stepwise cumulative distribution function could be filtered or otherwise smoothed (e.g., by linear interpolation between points defined by the bins of the histogram).

Such a cumulative distribution function could be used to determine a percentile for a particular response time by outputting the value of the cumulative distribution function that corresponds to the value of the particular response time. Additionally or alternatively, some other measure of the variation of the particular response time for the norm could be determined. For example, an effective Z-score could be determined for the particular response time by generating the Z-score that corresponds to a value taken from a Gaussian distribution at the same percentile as the particular response time, with respect to whatever distribution is being used to generate the percentile. So, for a given data point m, having a percentile score F(m) (e.g., a $95^{th}$-percentile response time of 56 milliseconds, having a percentile score of F(m)=0.95), the effective Z-score can be determined according to:

$$Z(m)=\sqrt{2}\text{erfc}^{-1}(2F(m))$$

where $\text{erfc}^{-1}(x)$ is the inverse complementary error function.

While histogram or other non-parametric methods may perform well in estimating the distribution of a set of response times, they may perform poorly for ranges of values for which no or very few observations are available. For example, the cumulative distribution function 680 determined from the histogram 660 provides a percentile score of 0% for any response time below the range of observed values 664 approximately 100% for any response time above the range of observed values 664. Thus, any response time outside and below the range of values 664 will receive the same percentile score (0%), even if the response times differ greatly. Similarly, any response time outside and above the range of values 664 will receive the same percentile score (~100%), despite great variation in response time. Accordingly, the percentile scores generated using only a histogram may be inaccurate when determined for outliers. This can result in poor anomaly detection, either missing anomalies that are present in a set of response times or detecting false-positive anomalies.

In order to improve the above histogram (or other non-parametric, e.g., kernel density estimation) method for estimating a probability distribution to model response times of a managed network, a parametric model could be fitted to the available set of response times in order to model the tail(s) of the probability distribution. To reflect the nature of outlier values observed in response times or other performance metrics, a heavy-tailed distribution (i.e., a distribution having one or two tails that are heavier than the exponential distribution) could be used. Such a heavy-tailed distribution could include a log-logistic distribution or a log-normal distribution. The particular distribution used could be selected based on the response time data, e.g., using a log-likelihood test. Alternatively, a short-tailed distribution, or a distribution having tail(s) that approximate the exponential, could be used in order to model a set of data.

The parametric distribution could be fitted to the entire set of response times or to a restricted set of the response times. For example, the parametric distribution could be fitted using only response times within a specified subset of the range of values spanned by the full set of response times, response times above a certain percentile of the observed response times, or a subset of the available response times selected via some other process. In examples wherein the response times exhibit a non-zero minimum response time, the parametric distribution may be fitted to the set (or subset) of response times after shifting the response times down by an amount equal to the minimum response time. For example, a log-normal distribution with such an offset can be expressed as:

$$M_i=M_0+\exp(\mu+\sigma W_i); W_i \sim N(0,1)$$

with $M_0$ representing the offset. However, the presence of the offset can confound the independent determination of the mean term of the log-normal part of the equation. Thus, the offset term can be determined based on an observed minimum response time value, and the remainder of the parameters of the offset log-normal determined using, e.g., maximum likelihood estimation.

Figure 7A:
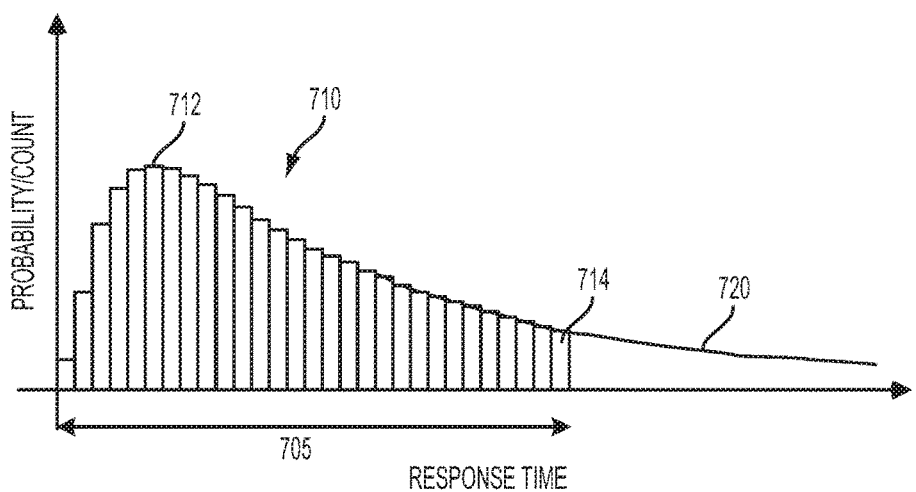
FIG. 7A shows a histogram and a parametric probability density function for a set of response times, in accordance with example embodiments.

FIG. 7A shows a histogram 710 (that includes an example bin 712) that has been determined based on a set of response times (not shown) that span a range of values 705. FIG. 7A also shows a portion of a heavy-tailed parametric distribution 720 that has been fitted to the set of response times (e.g., to the entire set of response times, or to a subset thereof). A probability distribution can be generated to model the response times based on the histogram 710 and parametric distribution 720. Such a probability distribution could include a central portion (that includes at least a portion of the range of values 705 spanned by the set of response times) based on the histogram 710 and a tail portion based on the parametric distribution 720.

Figure 7B:
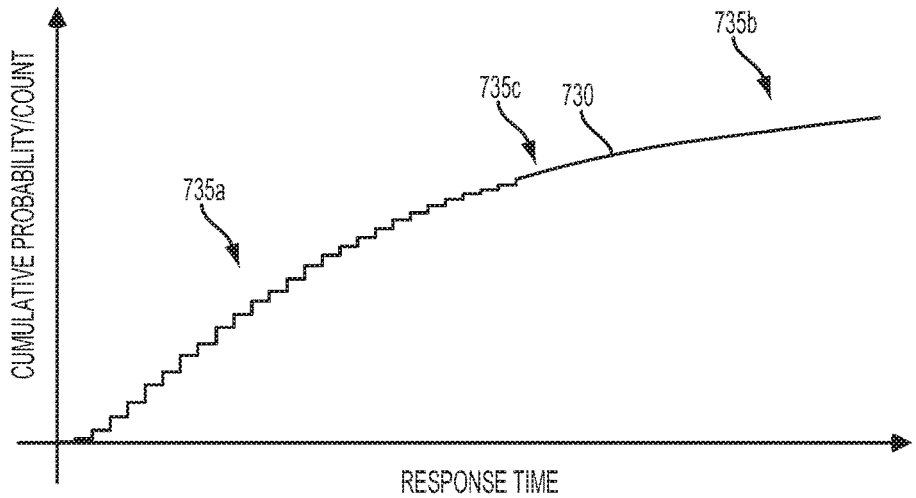
FIG. 7B shows a cumulative distribution function for a set of response times, in accordance with example embodiments.

Generating such a probability distribution can include generating a cumulative probability distribution from the histogram 710 and the parametric distribution 720. FIG. 7B depicts an example of such a cumulative probability distribution 730. The cumulative probability distribution 730 includes a central portion 735a based on bin(s) of the histogram 710 and a tail portion 735b based on the parametric distribution 720. The central portion 735a can be generated, e.g., by determining, for each of a plurality of different response times, the number of response times in every bin at or less than each of the different response times and dividing that number by the total number of response times used to generate the histogram. The tail portion 735b can be determined by generating a cumulative distribution function from the fitted heavy-tailed parametric distribution 720. A transition region 735c between the central portion 735a and the tail portion 735b can be determined by generating a linear, quadratic, or other monotonically-increasing function across the transition region 735c to connect the central portion 735a and the tail portion 735b.

The extent, with respect to response time values, of such a transition region 735c can be determined in a variety of ways. For example, a lower bound of the transition region 735c (and thus an upper bound of the central region 735a) could be determined based on a lower bound of one of the bins of the histogram 710 (e.g., a lower bound of the uppermost bin 714 of the histogram 710). An upper bound of the transition region 735c (and thus a lower bound of the tail region 735b) could be determined as a response time value that is sufficiently higher than the lower bound that the value of the tail portion at the upper bound is greater than the value of the central portion at the lower bound.

In an example of such a boundary determination, the bin boundaries of the bins of the histogram are labeled $b_i$, $i \in \{1, \ldots, B\}$. Effective Z-scores (or percentile scores, or some other normalized values) are then determined for each of the boundaries, as $Z(b_i)$, $i \in \{1, \ldots, B\}$. A right transition point, for the lower bound $t_r$ of a transition region for a right tail, could then be set to the lower bound of the rightmost bin, $b_{B-1}$, or to some other suitable location within the range of values spanned by the histogram. A first iteration to determine the effective Z-score of the upper bound of the transition region for the right tail could then be determined as $\hat{Z}_r=\max(3, \lceil Z_{center}(t_r) \rceil)$, where $Z_{center}(t_r)$ is the effective Z-score, as determined using the histogram, of the minimum lower bound $t_r$. A response time value $m_r$ could then be determined such that $Z_{tail}(m_r)=\hat{Z}_r$, where $Z_{tail}(m_r)$ is the effective Z-score, as determined using the parametric distribution, of the minimum lower bound $m_r$. If $m_r > t_r$, then $m_r$ can be used as the upper bound of the transition region. If not, $\hat{Z}_r$ can be incremented, and a new $m_r$ determined therefrom, until $m_r > t_r$. Once this inequality is satisfied, that $m_r$ can be used as the upper bound of the transition region. In practice, this process can be performed until $\hat{Z}_r = 8$. If a suitable $m_r$ has not been found by that point (or by some other cutoff point), the probability distribution build process could be aborted. A similar process may be used, mutatis mutandis, to determine the boundaries of a transition region for a left tail.

Accordingly, the complete description of the two-tailed cumulative probability distribution determined using such a method, with linear interpolation between the upper and lower bounds across the transition regions, can be described as:

$$Z_{model}(m) = \begin{cases} Z_{tail}(m) & \text{if } m < m_l \\ Z_{tail}(m_l) + \frac{Z_{center}(t_l) - Z_{tail}(m_l)}{t_l - m_l}(m - m_l) & \text{if } m_l \leq m < t_l \\ Z_{center}(m) & \text{if } t_l \leq m < t_r \\ Z_{center}(t_r) + \frac{Z_{tail}(m_r) - Z_{center}(t_r)}{m_r - t_r}(m - t_r) & \text{if } t_r \leq m < m_r \\ Z_{tail}(m) & \text{if } m \geq m_r \end{cases}$$

where $m_l$ is the lower bound of the left transition region, $t_l$ is the upper bound of the left transition region, $t_r$ is the lower bound of the right transition region, and $m_r$ is the upper bound of the right transition region. Note that, while the above equation depicts a single "tail" distribution having been fitted to both the left and right tails of the response time data, different distributions could be fitted to the left and right tails separately (e.g., by fitting to respective different sub-sets of the response time data).

In order to facilitate efficient encoding, use, and/or storage of the generated cumulative distribution function, a discrete set of values of the cumulative distribution function within the tail region(s) may be calculated at a set of discrete points. For example, a record of a cumulative distribution function could include the distribution values and response time values at the boundaries between bins of the histogram. The record of a cumulative distribution function could additionally include a number of points, in half-step increments with respect to Z, for values outside the "central" portion of the determined distribution (e.g., outside of the determined lower boundary of the right transition region $t_r$ and/or the upper boundary of the left transition region $t_l$). For example, for a two-tailed distribution, we solve $Z_{model}(m) = Z_i$ for $Z_i \in [-8, -7.5, \ldots, -3.5, -3, 3, 3.5, \ldots, 7.5, 8]$. Percentile scores, effective Z-scores, or other probabilistic information could then be determined for response times by interpolating between the values at the discrete points.

Figure 7C:
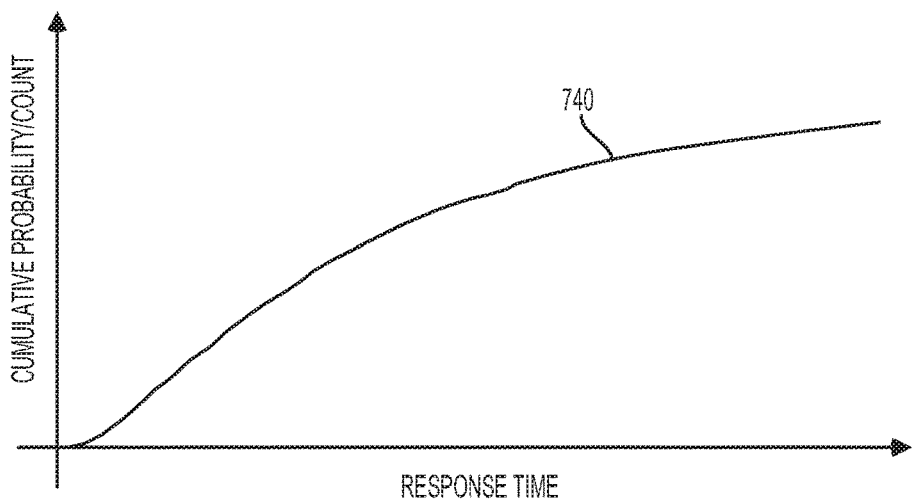
FIG. 7C shows a cumulative distribution function for a set of response times, in accordance with example embodiments.

A cumulative probability distribution determined as described herein could be filtered, interpolated, or otherwise smoothed. FIG. 7C shows a smoothed cumulative probability distribution 740 determined by applying a linear interpolation between the bin count values used to determine the stepwise cumulative probability distribution 730 depicted in FIG. 7B.

Figure 8A:
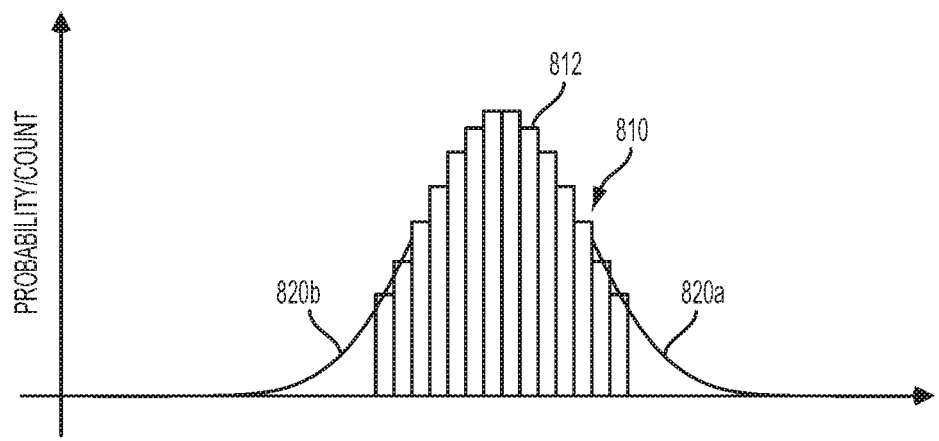
FIG. 8A shows a histogram and a parametric probability density function for a set of response times, in accordance with example embodiments.
Figure 8B:
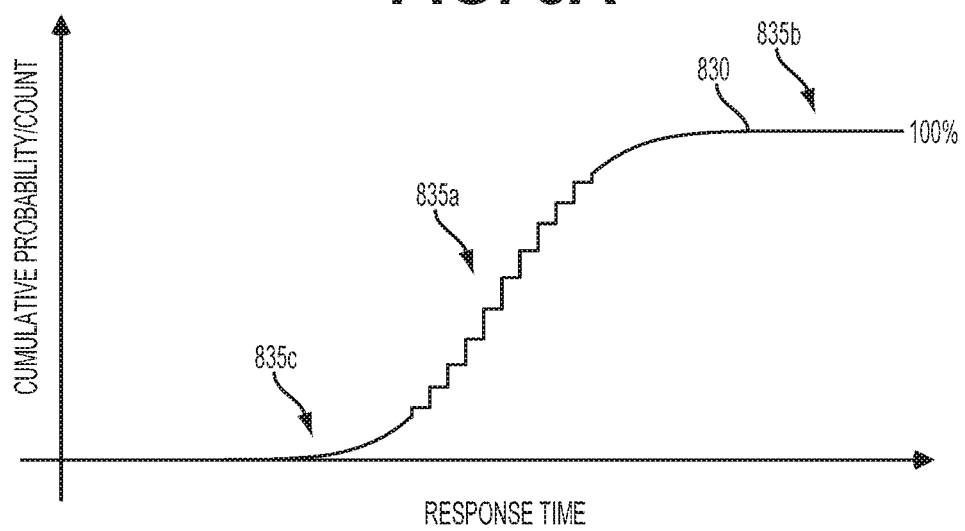
FIG. 8B shows a cumulative distribution function for a set of response times, in accordance with example embodiments.

The distribution shown in FIGS. 7A-C is limited to positive-valued response times, and thus has a single tail. Note, however, that the methods described herein may be applied to train probability distributions for performance metrics that exhibit two tails. This is illustrated by way of example in FIGS. 8A and 8B. FIG. 8A shows a histogram 810 (that includes an example bin 812) that has been determined based on a set of response times (not shown) that span a range of values. FIG. 8A also shows a first portion of a short-tailed parametric distribution 820a (e.g., a Gaussian distribution) that has been fitted to the set of response times (e.g., to the entire set of response times, or to a subset thereof) and a second portion of a parametric distribution 820b that has been fitted to the set of response times. FIG. 8B depicts an example of a cumulative probability distribution 830 having two tails. The cumulative probability distribution 830 includes a central portion 835a based on bin(s) of the histogram 810, an upper tail portion 835b based on the first parametric distribution 820a, and a lower tail portion 835c based on the second parametric distribution 820b.

VI. Example Operations

Figure 9:
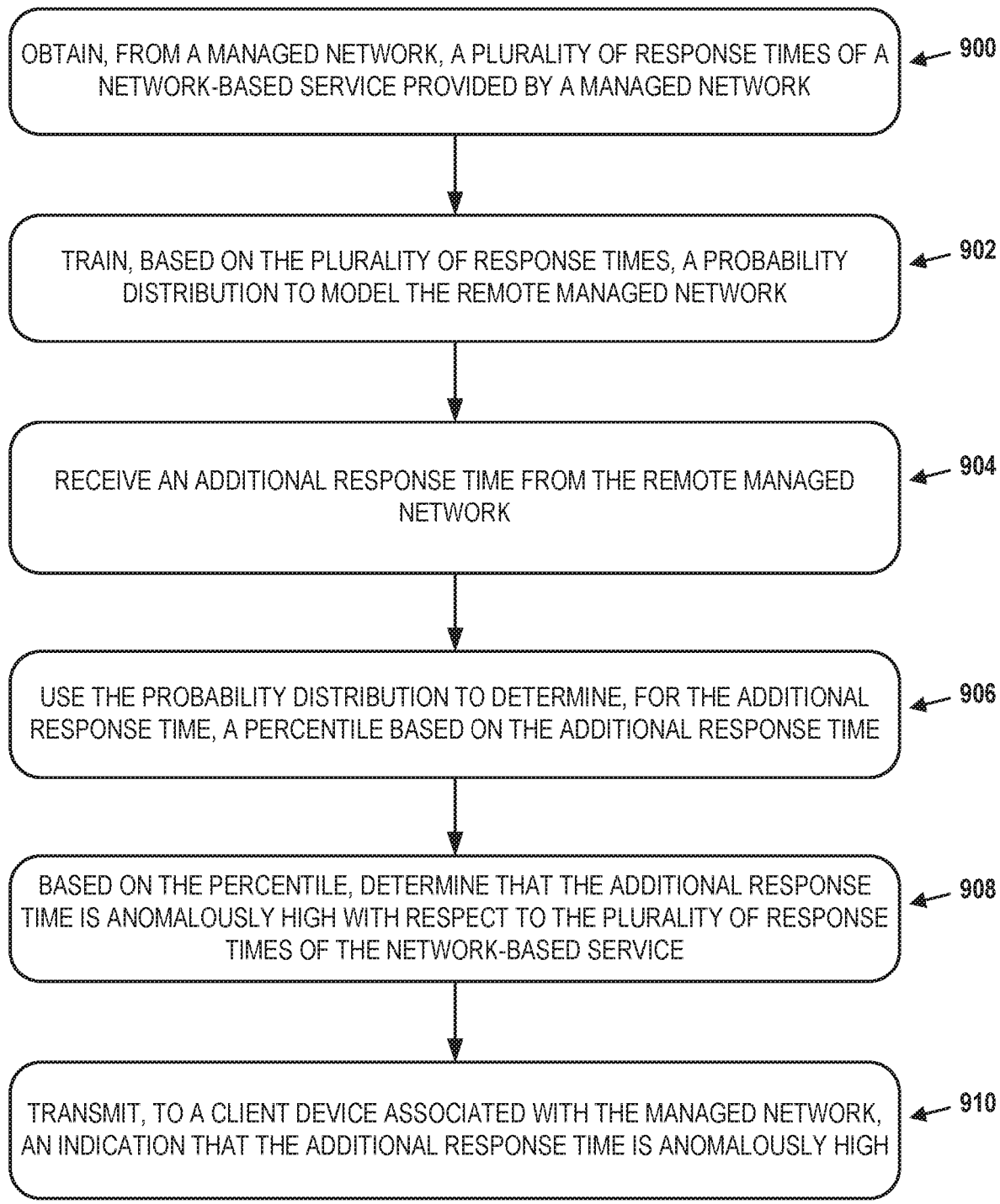
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. The embodiments of FIG. 9 may be simplified by the removal of any one or more of the features shown therein. Further, these embodiments may be combined with features, aspects, and/or implementations of any of the previous figures or otherwise described herein.

The example method of FIG. 9 includes obtaining, from a managed network, a plurality of response times of a network-based service provided by the managed network (900). The response times span a range of values.

The example method of FIG. 9 additionally includes training, based on the plurality of response times, a probability distribution to model the managed network (902). Training the probability distribution includes: (i) generating, based on the plurality of response times, a plurality of bins that span respective portions of the range of values; and (ii) generating the probability distribution for the plurality of response times. Generating a particular bin of the plurality of bins includes determining a number of the plurality of response times whose values fall within the particular bin. The probability distribution includes a central portion and a tail portion. Generating the probability distribution includes generating the central portion based on at least one of the plurality of bins and generating the tail portion by fitting a parametric distribution (e.g., a heavy-tailed parametric distribution, a short-tailed parametric distribution) to at least one of the plurality of response times. This process may be performed according to a schedule and/or on an ongoing basis to refine the trained distribution and/or to update the trained distribution as the distribution of the response times changes (e.g., with changes in the configuration of the managed network and/or changes in the environment of the managed network).

The example method of FIG. 9 also includes receiving an additional response time from the managed network (904). The example method of FIG. 9 further includes using the probability distribution to determine, for the additional response time, a percentile based on the additional response time (906). The example method of FIG. 9 also includes, based on the percentile, determining that the additional response time is anomalously high with respect to the plurality of response times of the network-based service (908). The example method of FIG. 9 further includes transmitting, to a client device associated with the managed network, an indication that the additional response time is anomalously high (910).

The example method of FIG. 9 could include additional or alternative steps. For example, the method could include taking automated actions in response to determining that the additional response time is anomalously high. Such actions could include bringing additional server(s) online, spinning up additional VMs, degrading a provided service in a controlled manner, or taking some other automatic action. The method could include transmitting, to the managed network, one or more commands or some other indication of the automated action to take. The method could include updating the generated probability distribution based on additional response times, e.g., based on response times measured after the probability distribution was originally generated. Such an update process could be performed according to a regular schedule or according to some other consideration.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid-state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing device disposed within a computational instance of a remote network management platform, wherein the computational instance is dedicated to a managed network, and wherein the computing device is configured to detect one or more anomalies occurring within the managed network based on response times of one or more computational devices associated with one or more network-based services of the managed network, comprising:
 a tangible non-transitory memory; and
 one or more hardware processors configured to read instructions from the tangible non-transitory memory to perform operations comprising:
  obtaining, from the managed network, a plurality of response times of at least one network-based service of the one or more network-based services of the managed network, wherein the plurality of response times span a range of values;
  training, based on the plurality of response times, a probability distribution to model the managed network, wherein training the probability distribution comprises:
   generating, based on the plurality of response times, a plurality of bins that each span a respective portion of the range of values, wherein generating a particular bin of the plurality of bins comprises determining a number of response times of the plurality of response times whose values fall within the particular bin;

determining a percentile of one or more response times based on the plurality of bins and the plurality of response times; and generating the probability distribution for the plurality of response times, by:

generating a central portion based on one or more bins of the plurality of bins using a first subset of the plurality of response times within a first subset of the range of values below a first percentile threshold, wherein the central portion is determined based on a non-parametric distribution of the first subset of the plurality of response times within the first subset of the range of values; and generating a tail portion based on one or more bins of the plurality of bins by fitting a parametric distribution to at least one response time of a second subset of the plurality of response times within a second subset of the range of values above the first percentile threshold, wherein the parametric distribution is determined based on a logarithmic distribution of the response times within the second subset of the range of values;

receiving an additional response time from the managed network;

using the probability distribution to determine, for the additional response time, a percentile based on the additional response time;

based on the percentile, determining that the additional response time is deviated beyond a threshold level with respect to the plurality of response times of the at least one network-based service;

transmitting, to a client device associated with the managed network, an indication that the additional response time is deviated beyond the threshold level; and bringing one or more additional computational devices online in response to determining that the additional response time is deviated beyond the threshold level to prevent subsequent response times of the one or more computational devices from being deviated beyond the threshold level.

2. The computing device of claim 1, wherein the operations comprise:

obtaining one or more further response times; and using the probability distribution to determine, for the one or more further response times, respective percentiles based on the one or more further response times;

wherein determining that the additional response time is deviated beyond the threshold level comprises determining that the additional response time is deviated beyond the threshold level based on the percentile determined for the additional response time and the respective percentiles determined for the one or more further response times.

3. The computing device of claim 1, wherein using the probability distribution to determine the percentile based on the additional response time comprises using the probability distribution to determine an effective Z-score based on the additional response time.

4. The computing device of claim 1, wherein the parametric distribution is a log-logistic distribution, a log-normal distribution, or a combination of both.

5. The computing device of claim 1, comprising:

using the probability distribution to generate a cumulative probability distribution for the plurality of response times based at least in part on one or more bins of the plurality of bins; and determining the percentile of the additional response time based on the generated cumulative probability distribution.

6. The computing device of claim 5, wherein the generated cumulative probability distribution includes generating a transition portion that monotonically transitions between the central portion and the tail portion by determining a lower bound and an upper bound of the transition portion based on boundaries of the central portion and the tail portion with the transition portion.

7. The computing device of claim 6, wherein generating the central portion of the cumulative probability distribution comprises (i) generating a discrete cumulative distribution function based on the one or more bins of the plurality of bins, and (ii) smoothing the generated discrete cumulative distribution function.

8. The computing device of claim 1, wherein generating the probability distribution for the plurality of response times comprises generating the central portion based on one or more bins of the plurality of bins using the first subset of the plurality of response times within the first subset of the range of values above a second percentile threshold.

9. The computing device of claim 8, wherein generating the probability distribution for the plurality of response times comprises generating a second tail portion based on one or more bins of the plurality of bins by fitting a second parametric distribution to at least one response time of a third subset of the plurality of response times within a third subset of the range of values below the second percentile threshold, wherein the second parametric distribution is determined based on a logarithmic distribution of the response times within the second subset of the range of values.

10. The computing device of claim 1, wherein generating the plurality of bins that each span the respective portions of the range of values comprises selecting each respective portion of the range of values based on equal number of incident reports per bin, equal time frames, or a combination thereof.

11. A method for detecting one or more anomalies occurring within a managed network based on response times of one or more network-based services of the managed network by a computational instance of a remote network management platform, wherein the remote network management platform comprises one or more hardware processors configured to read instructions from a tangible non-transitory memory to perform operations, comprising:

obtaining, from the managed network, a plurality of response times of at least one network-based service of the one or more network-based services of the managed network, wherein the plurality of response times span a range of values;

training, based on the plurality of response times, a probability distribution to model the managed network, wherein training the probability distribution comprises:

generating, based on the plurality of response times, a plurality of bins that each span a respective portion of the range of values, wherein generating a particular bin of the plurality of bins comprises determining a number of response times of the plurality of response times whose values fall within the particular bin;

determining a percentile of one or more response times based on the plurality of bins; and generating the probability distribution for the plurality of response times, by:

generating a central portion based on one or more bins of the plurality of bins using a first subset of the plurality of response times within a first subset of the range of values below a first percentile threshold, wherein the central portion is determined based on a non-parametric distribution of the first subset of the plurality of response times within the first subset of the range of values; and generating a tail portion based on one or more bins of the plurality of bins by fitting a parametric distribution to at least one response time of a second subset of the plurality of response times within a second subset of the range of values above the first percentile threshold, wherein the parametric distribution is determined based on a logarithmic distribution of the response times within the second subset of the range of values;

receiving an additional response time from the managed network;

using the probability distribution to determine, for the additional response time, a percentile based on the additional response time;

based on the percentile, determining that the additional response time is deviated beyond a threshold level with respect to the plurality of response times of the at least one network-based service;

transmitting, to a client device associated with the managed network, an indication that the additional response time is deviated beyond the threshold level; and degrading one or more other network-based services of the managed network in response to determining that the additional response time is deviated beyond the threshold level to prevent the subsequent response times of the one or more network-based services of the managed network from being deviated beyond the threshold level.

12. The method of claim 11, further comprising:

obtaining one or more further response times; and using the probability distribution to determine, for the one or more further response times, respective percentiles based on the one or more further response times;

wherein determining that the additional response time is deviated beyond the threshold level comprises determining that the additional response time is deviated beyond the threshold level based on the percentile determined for the additional response time and the respective percentiles determined for the one or more further response times.

13. The method of claim 11, wherein using the probability distribution to determine the percentile based on the additional response time comprises using the probability distribution to determine an effective Z-score based on the additional response time.

14. The method of claim 11, wherein the parametric distribution is a log-logistic distribution, a log-normal distribution, or both.

15. The method of claim 11, comprising:

using the probability distribution to generate a cumulative probability distribution for the plurality of response times based at least in part on one or more bins of the plurality of bins; and determining the percentile of the additional response time based on the generated cumulative probability distribution.

16. An article of manufacture including a tangible non-transitory computer-readable medium, having stored thereon program instructions that, upon execution by one or more hardware processors of a computing system, cause the computing system to perform operations to detect one or more anomalies occurring within a managed network based on response times of one or more network-based services of the managed network, comprising:

obtaining, via the one or more hardware processors, from the managed network, a plurality of response times of at least one network-based service of the one or more network-based services of the managed network, wherein the plurality of response times span a range of values;

training, via the one or more hardware processors, based on the plurality of response times, a probability distribution to model the managed network, wherein training the probability distribution comprises:

generating, based on the plurality of response times, a plurality of bins that each span a respective portion of the range of values, wherein generating a particular bin of the plurality of bins comprises determining a number of response times of the plurality of response times whose values fall within the particular bin;

determining a percentile of one or more response times based on the plurality of bins; and generating the probability distribution for the plurality of response times, by:

generating a central portion based on one or more bins of the plurality of bins using a first subset of the plurality of response times within a first subset of the range of values below a first percentile threshold, wherein the central portion is determined based on a non-parametric distribution of the first subset of the plurality of response times within the first subset of the range of values; and generating a tail portion based on one or more bins of the plurality of bins by fitting a parametric distribution to at least one response time of a second subset of the plurality of response times within a second subset of the range of values above the first percentile threshold, wherein the parametric distribution is determined based on a logarithmic distribution of the response times within the second subset of the range of values;

receiving, via the one or more hardware processors, an additional response time from the managed network;

using the probability distribution to determine, via the one or more hardware processors, for the additional response time, a percentile based on the additional response time;

based on the percentile, determining, via the one or more hardware processors, that the additional response time is deviated beyond a threshold level with respect to the plurality of response times of the network-based service;

transmitting, via the one or more hardware processors, to a client device associated with the managed network, an indication that the additional response time is deviated beyond the threshold level; and bringing one or more additional computational devices online, via the one or more hardware processors, in response to determining that the additional response time is deviated beyond the threshold level to prevent subsequent response times of the one or more computational devices from being deviated beyond the threshold level.

17. The article of manufacture of claim 16, wherein the operations comprise:
  obtaining one or more further response times; and
  using the probability distribution to determine, for the one or more further response times, respective percentiles based on the one or more further response times;
  wherein determining that the additional response time is deviated beyond the threshold level comprises determining that the additional response time is deviated beyond the threshold level based on the percentile determined for the additional response time and the respective percentiles determined for the one or more further response times.

18. The article of manufacture of claim 16, wherein using the probability distribution to determine the percentile based on the additional response time comprises using the probability distribution to determine an effective Z-score based on the additional response time.

19. The article of manufacture of claim 16, wherein the parametric distribution is a log-logistic distribution, a log-normal distribution, or a combination of both.

20. The article of manufacture of claim 16, comprising:
  using the probability distribution to generate a cumulative probability distribution for the plurality of response times based at least in part on one or more bins of the plurality of bins; and
  determining the percentile of the additional response time based on the generated cumulative probability distribution.

* * * * *